(12) United States Patent
Wang (10) Patent No.: US 12,252,029 B2
(45) Date of Patent: Mar. 18, 2025

(54) ELECTRIC VEHICLE CHARGING MANAGEMENT METHODS AND SYSTEMS CAPABLE OF INTEGRATING PHYSICAL SENSING CARD AND APPLICATION PROGRAM

(71) Applicant: Noodoe Group Inc., Wilmington, DE (US)

(72) Inventor: John C. Wang, Taipei (TW)

(73) Assignee: NOODOE GROUP INC., Wilmington, DE (US)

( * ) Notice: Subject to any disclaimer, the term of this patent is extended or adjusted under 35 U.S.C. 154(b) by 662 days.

(21) Appl. No.: 17/549,947

(22) Filed: Dec. 14, 2021

(65) Prior Publication Data

US 2022/0305944 A1 Sep. 29, 2022

(30) Foreign Application Priority Data

Mar. 26, 2021 (TW) .................................. 110111195

(51) Int. Cl.
*H01M 10/44* (2006.01)
*B60L 53/30* (2019.01)
*B60L 53/66* (2019.01)
*H01M 10/46* (2006.01)

(52) U.S. Cl.
CPC .......... *B60L 53/665* (2019.02); *B60L 53/305* (2019.02)

(58) Field of Classification Search
CPC ...... H02J 7/0044; B60L 53/65; B60L 53/305; B60L 53/665
USPC ................................ 320/104, 107, 109, 138
See application file for complete search history.

(56) References Cited

U.S. PATENT DOCUMENTS

| | | | |
|---|---|---|---|
| 2017/0282736 A1* | 10/2017 | Goei | B60L 53/60 |
| 2021/0049712 A1* | 2/2021 | Devaraj | B60L 53/68 |
| 2021/0080282 A1* | 3/2021 | Goei | G01C 21/3679 |
| 2021/0281096 A1* | 9/2021 | Maeda | B60L 53/66 |
| 2021/0284043 A1* | 9/2021 | Wang | B60L 58/20 |

* cited by examiner

*Primary Examiner* — Edward Tso
(74) *Attorney, Agent, or Firm* — McClure, Qualey & Rodack, LLP (57) ABSTRACT

Electric vehicle charging management methods and systems are provided. First, an application of a mobile device is used to obtain identification data of a physical sensing card, and a binding request is sent to a server, wherein the binding request includes the identification data and a user ID code of the mobile device or the application. The server searches a database based on the identification data to obtain a card ID code of the physical sensing card, and associates the card ID code with the user ID code. The server provides a mobile device to initiate a first charging operation at an electric vehicle charging station using the application, and the server receives the card ID code of the physical sensing card detected by the electric vehicle charging station, and initiate a second charging operation at the electric vehicle charging station.

19 Claims, 10 Drawing Sheets

ELECTRIC VEHICLE CHARGING MANAGEMENT METHODS AND SYSTEMS CAPABLE OF INTEGRATING PHYSICAL SENSING CARD AND APPLICATION PROGRAM

BACKGROUND OF THE INVENTION

Field of the Invention

The disclosure relates generally to electric vehicle charging management methods and systems, and, more particularly to electric vehicle charging management methods and systems that can integrate the user's physical sensing card and an application to facilitate the user's charging operation.

Description of the Related Art

Recently, with the rising awareness of environmental protection and electric vehicle technology advances, the development of electric vehicles powered by electrical energy to replace traditional vehicles powered by fossil fuels has gradually become an important goal in the automotive field, thus making electric vehicles become more and more popular. In order to increase the range and willingness to use electric vehicles, many countries or cities have begun to set up charging stations in public places to provide electricity to electric vehicles, and have also begun to plan the deployment of a large number of charging stations in urban areas or scenic areas, so as to make the charging of electric vehicles more convenient.

Additionally, with the gradual improvement of the supporting measures for charging, various automakers are also actively launching various electric vehicle models to seize the business opportunities of electric vehicles. Automakers usually give consumers a certain amount of charging stored value to increase consumers' willingness to buy cars. Generally speaking, the automakers will build its own charging station or cooperate with the charging station operators, and will issue a physical sensing card to the car owner. The car owner can use the physical sensing card to sense at the charging station for charging operations.

Currently, most charging station operators will develop their applications, and their users can use the applications to query the location of the charging station, start charging operations, and view the charging progress. As mentioned earlier, car owners can use the physical sensing card provided by the automakers to charge at the charging station of the charging station operator. However, charging through the physical sensing card cannot obtain the similar functions of the application, such as querying the location of the charging station and checking the charging progress. The physical sensing card has its convenience, but if the car owner forgets to carry the card or loses the card, it will not be able to charge, which will cause great trouble to the car owner.

BRIEF SUMMARY OF THE INVENTION

In an electric vehicle charging management method for use in a server connected with at least one electric vehicle charging station, and a mobile device. First, an application of the mobile device is used to obtain identification data of a physical sensing card, and a binding request is sent to a server, wherein the binding request includes the identification data and a user ID code of the mobile device or the application. The server searches a database based on the identification data to obtain a card ID code of the physical sensing card, and associates the card ID code with the user ID code. The server provides a mobile device to initiate a first charging operation at an electric vehicle charging station using the application, and the server receives the card ID code of the physical sensing card detected by the electric vehicle charging station, and initiate a second charging operation at the electric vehicle charging station.

An embodiment of an electric vehicle charging management system comprises a mobile device, at least one electric vehicle charging station, and a server. The mobile device executes an application to obtain identification data of a physical sensing card, and sends a binding request to a server, wherein the binding request comprises the identification data and a user ID code of the mobile device or the application. The server searches a database based on the identification data to obtain a card ID code of the physical sensing card, and associates the card ID code with the user ID code. The server allows the mobile to initiate a first charging operation at an electric vehicle charging station using the application. The server receives the card ID code of the physical sensing card detected by the electric vehicle charging station, and in response to the reception of the card ID code, initiates a second charging operation at the electric vehicle charging station.

In some embodiments, the server associates a first charging fee corresponding to the first charging operation and a second charging fee corresponding to the second charging operation to a user corresponding to the user ID code.

In some embodiments, a two-dimensional ID corresponding to the electric vehicle charging station is scanned by using the application, and the two-dimensional ID is sent to the server via the network. The server transmits a charging start command to the electric vehicle charging station via the network according to the two-dimensional ID, so that the electric vehicle charging station executes the first charging operation.

In some embodiments, the server records a membership period corresponding to the user ID code, wherein the membership period has a start date and an expiration date. The server obtains a current date, and determines whether the current date falls within the membership period. When the current date falls within the membership period, the server waives the first charging fee and the second charging fee.

In some embodiments, when the current date does not fall within the membership period, the server generates an online payment link and sends the online payment link to the mobile device. The server determines whether a payment completion notification corresponding to the online payment links is received. When the payment completion notification corresponding to the online payment link is received, the server extends the membership period corresponding to the user ID code.

In some embodiments, the server periodically generates a charging fee bill corresponding to the user ID code, wherein the charging fee bill comprises at least the first charging fee and the second charging fee. The charging fee bill is provided to a car factory terminal, wherein the car factory terminal performs a payment procedure according to the charging fee bill.

In some embodiments, the server records a stored value amount corresponding to the user ID code, and deducts the first charging fee and the second charging fee from the stored value amount.

In some embodiments, the server receives an automatic stored value setting corresponding to the user ID code, and determines whether the stored value amount is lower than a predetermined amount. When the stored value amount is lower than the predetermined amount, the server automatically adds a preset amount to the stored value amount according to payment information corresponding to the user ID code.

In some embodiments, the identification data is a two-dimensional ID printed on of the physical sensing card, and the application obtains the identification data by scanning the two-dimensional ID.

Electric vehicle charging management methods may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 1:
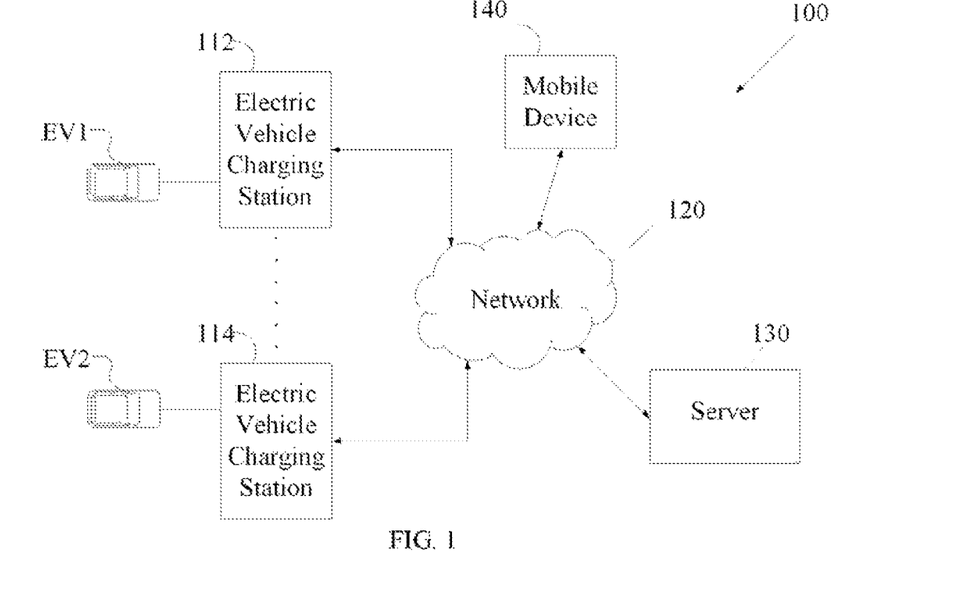
FIG. 1 is a schematic diagram illustrating an embodiment of an electric vehicle charging management system of the invention.

FIG. 1 is a schematic diagram illustrating an embodiment of an electric vehicle charging management system of the invention. The electric vehicle charging management system 100 comprises a plurality of electric vehicle charging stations, such as the electric vehicle charging stations 112 and 114, and a server 130 respectively connected with the respective electric vehicle charging stations via a network 120. The respective charging stations can provide electric vehicles (EV1, EV2) for charging operations. In some embodiments, the network 120 may be a wired network, a telecommunication network, and a wireless network, such as a Wi-Fi network. The server 130 can receive various data from the respective electric vehicle charging stations (112, 114) via the network 120, and transmit related signals to the respective electric vehicle charging stations (112, 114). The respective electric vehicle charging stations (112, 114) can perform related operations according to the signals received from the server 130. For example, when the electric vehicle EV1 is coupled to the electric vehicle charging station 112 through a charging gun of the electric vehicle charging station 112 for a charging operation, the electric vehicle charging station 112 can continuously transmit charging information corresponding the charging operation of the electric vehicle EV1 via the network 120, and the server 130 can receive the charging information of the corresponding charging operation from the electric vehicle charging station 112 via the network 120. Similarly, when the electric vehicle EV2 is coupled to the electric vehicle charging station 114 through a charging gun of the electric vehicle charging station 114 to perform a charging operation, the electric vehicle charging station 114 can continuously transmit the charging information corresponding the charging operation of the electric vehicle EV2 via the network 120, and the server 130 can receive the charging information of the corresponding charging operation from the electric vehicle charging station 114 via the network 120.

It is noted that the user can connect the electric vehicle EV1 and the electric vehicle charging station 112 to each other, such as inserting a charging gun into the charging port of the electric vehicle to send a charging request corresponding to the electric vehicle charging station 112 to use the electric vehicle charging station 112. The electric vehicle charging station 112 performs a charging operation for the electric vehicle EV1. Similarly, the user can connect the electric vehicle EV2 and the electric vehicle charging station 114 to each other, such as inserting a charging gun into the charging port of the electric vehicle to send a charging request corresponding to the electric vehicle charging station 114 to use the electric vehicle charging station 114. It is understood that, in some embodiments, the server 130 may directly or indirectly receive a charging request from a mobile device (not shown in FIG. 1) of the owner of the electric vehicle EV1, and generate a charging authorization command based on the charging request and transmit it to the electric vehicle charging station 112 via the network 120, so that the electric vehicle charging station 112 outputs power to the electric vehicle EV1, such as an electric scooter or an electric car, which is electrically connected to it, or prohibits the electric vehicle charging station 112 from outputting power to the electric vehicle EV1. It is reminded that, in some embodiments, the charging request may be accompanied by an identity authentication and/or a payment mechanism, and the charging authorization command will only be generated after the identity authentication and/or payment mechanism is completed. In some embodiments, the user of the electric vehicle EV1 can use his/her mobile device to download and install an application to generate a charging request through the user interface of the application. In some embodiments, the user can scan a Quick Response Code (QR code) on the electric vehicle charging station 112 through the scanning function of the application to generate the above-mentioned charging request, thereby starting a charging operation. In some embodiments, the user can select a specific charging station through the application and execute an activation function to generate the above-mentioned charging request, thereby starting a charging operation. It is understood that, in some embodiments, the owner of the electric vehicle EV1 can use a physical sensing card, such as an RFID card to approach an induction area (not shown in FIG. 1) on the electric vehicle charging station 112 to generate a corresponding charging request, and sent it to the server 130 via the network 120. It is reminded that, in some embodiments, each user can have an RFID card.

It is noted that, the mobile device 140 corresponding to the owner of the electric vehicle can be any electronic device capable of Internet access, such as mobile devices, such as mobile phones, smart phones, personal digital assistants, global positioning systems, and notebook computers. In some embodiments, the mobile device 140 can receive status information and notifications of the corresponding charging operation from the cloud management server 130 via the network 120. In some embodiments, the status information and notification may include notifying that the electric vehicle has stopped charging, notifying that the vehicle needed to be moved, and/or notifying that the charging gun of the electric vehicle charging device has been disconnected from the electric vehicle, and so on.

It is understood that, in some embodiments, the server 130 can perform a load adjustment operation for the electric vehicle charging stations. Specifically, the server 130 can generate an instruction and send the instruction to the charging station (112, 114) via the network 120 to control the charging station to output power for charging with a specified power parameter, such as a specified amperage, during a specific period of time to the electric vehicle connected to the station, or to prohibit the charging station from outputting power to the electric vehicle.

Figure 2:
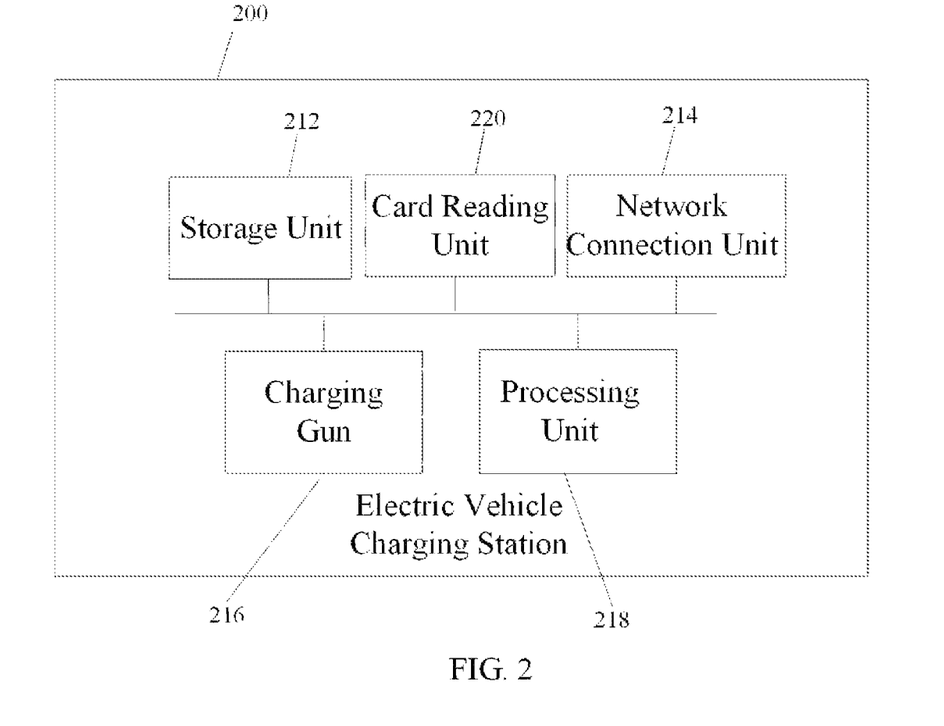
FIG. 2 is a schematic diagram illustrating an embodiment of an electric vehicle charging station of the invention.

FIG. 2 is a schematic diagram illustrating an embodiment of an electric vehicle charging station of the invention. The electric vehicle charging station 200 shown in FIG. 2 can be applied to the electric vehicle charging stations (112, 114) in FIG. 1, which has processing and computing capabilities to perform charging management operations for the electric vehicle charging station 200. The electric vehicle charging station 200 has a network connection capability to receive, download or update various parameters and information required for charging management calculations.

The electric vehicle charging station 200 at least comprises a storage unit 212, a network connection unit 214, a charging gun 216, a processing unit 218, and a card reading unit 220. The storage unit 212 may be a memory or a database for storing and recording related data. The data may be related information such as charging station ID of the electric vehicle charging station and charging requests. It should be noted that the aforementioned information is only example, and the invention is not limited thereto. The network connection unit 214 can use a network, such as a wired network, a telecommunications network, and a wireless network, such as a Wi-Fi network, to receive, download, or update various parameters and information required for charging management operations. The charging gun 216 may include one or more charging connectors that meet the same charging interface specification or meet different charging interface specifications, and are electrically connected to the corresponding electric vehicle. The processing unit 218 can control the operations of related software and hardware in the electric vehicle charging station 200, and cooperate with the server 130 to execute the electric vehicle charging management methods of the invention. Related details will be described later. It is noted that, in some embodiments, the processing unit 218 may be a general-purpose controller, a Micro-Control Unit, MCU, or a Digital Signal Processor, DSP, etc., to provide functions of data analysis, processing and calculation, but the present invention is not limited to this. In one embodiment, the processing unit 216 may use the network connection unit 214 to transmit the power state of the corresponding electric vehicle through a network for a cloud management server, such as the cloud server 130, for subsequent charging management. In another embodiment, the processing unit 216 can obtain the power parameter of a charging operation from the server 130, determine the output power according to the power parameter received from the server 130, and output the power to at least one electric vehicle through the charging gun 216 to perform the charging operation. The card reading unit 220 may be an RFID reading unit for sensing information of a physical sensing card, such as an RFID card. The information may be a card ID code corresponding to the physical sensing card.

It is understood that, the electric vehicle charging station 200 has an upper power limit value and a lower power limit value. Specifically, the electric vehicle charging station 200 can use the upper power limit value as the power parameter at the highest to output power to the electric vehicle during a charging operation. On the other hand, the electric vehicle charging station 200 needs to use the lower power limit value as the power parameter at least to output power to the electric vehicle during a charging operation. It must be noted that, charging stations of different brands and models may have different upper power limit values for output power and lower power limit values for output power. The present invention is not limited to any value, and the value may be different for different charging stations.

Figure 3:
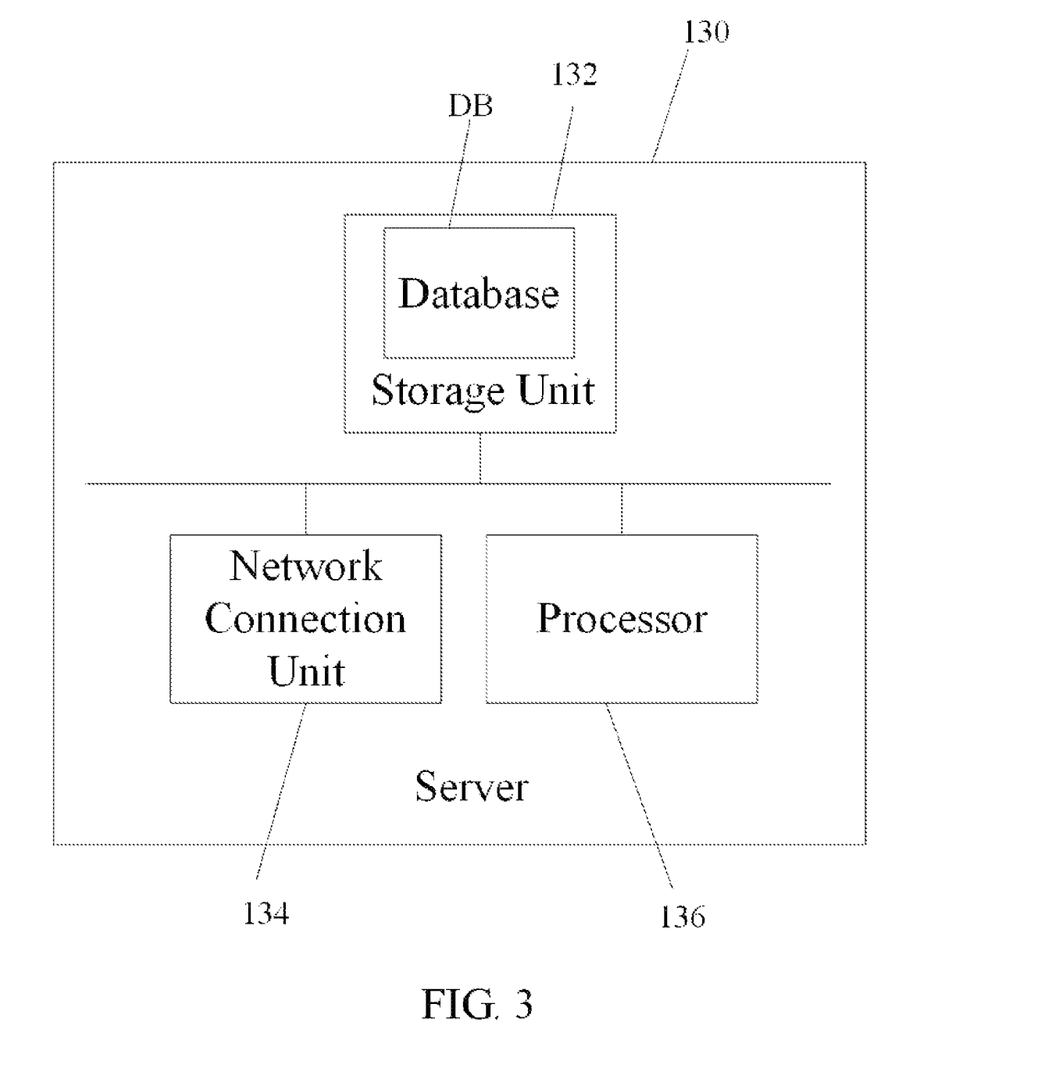
FIG. 3 is a schematic diagram illustrating an embodiment of a server of the invention.

FIG. 3 is a schematic diagram illustrating an embodiment of a server of the invention. As shown in FIG. 3, the server 130 of the invention can be any processor-based electronic device, which comprises at least a storage unit 132, a network connection unit 134, and a processor 136. It is noted that, the server 130 can receive various data corresponding to a plurality of electric vehicle charging stations in a charging field. The server 130 can directly or indirectly receive a charging request from a mobile device, and after completing actions such as identity confirmation in response to the charging request, generate a charging authorization command and transmit it to the corresponding electric vehicle charging station via the network. In response to the charging authorization command, the electric vehicle charging station is allowed to output power to an electric vehicle (for example, an electric motorcycle or an electric vehicle, etc.) that is electrically connected to it, or prohibit the electric vehicle charging station from outputting power to the electric vehicle.

The storage unit 132 may be a memory, which can store and record related data, such as various data of the electric vehicle charging stations. It is noted that, the storage unit 132 may comprise a database DB for recording an identification data on the corresponding physical sensing card and its corresponding card ID code. It is noted that, in some embodiments, the identification data may be a two-dimensional identification code, such as a QR code printed on the physical sensing card. In addition, in some embodiments, the database may also record the user ID code corresponding to different users, and the corresponding stored value amount that can be used for charging. When a specific user is charging, the charging fee generated by the charging operation can be deducted from the amount of stored value corresponding to the specific user. Through the network connection unit 134, the server 130 can be coupled to and communicates with the electric vehicle charging stations (112, 114) via the network 120, such as a wired network, a telecommunications network, and a wireless network, such as a Wi-Fi network, and transmits related data/signals/commands to different electric vehicle charging stations via the network 120 to control whether the electric vehicle charging stations output power, and specify power parameters for outputting power to electric vehicles. The processor 136 can control the operations of related software and hardware in the server 130, and execute the electric vehicle charging management methods of the invention. The relevant details will be described later. It is understood that, in some embodiments, the processor 136 may be a general-purpose controller, a Micro-Control Unit, MCU, or a Digital Signal Processor, DSP, etc., to provide data analysis, processing, and calculation functions.

Figure 4:
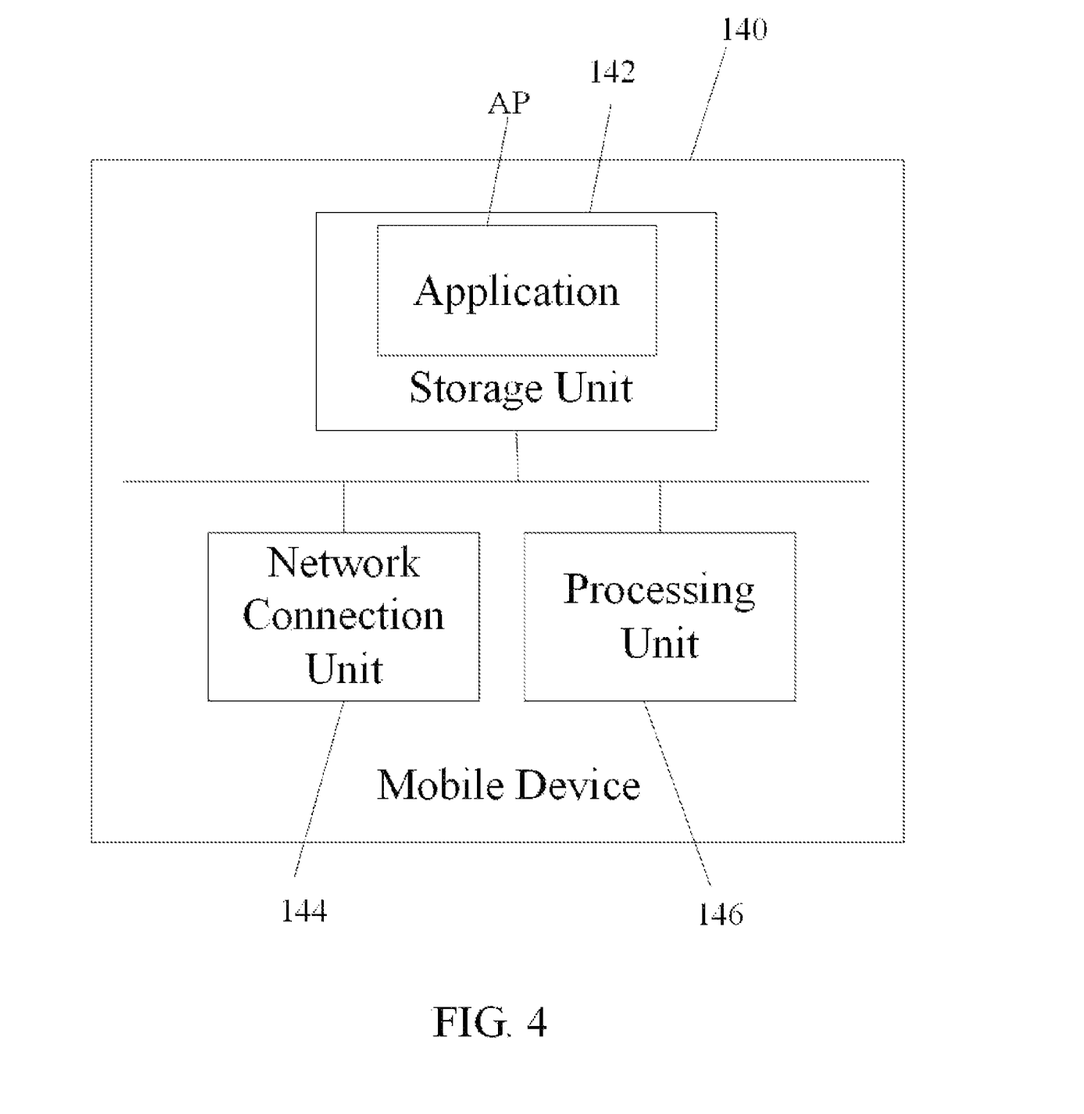
FIG. 4 is a schematic diagram illustrating an embodiment of a mobile device of the invention.

FIG. 4 is a schematic diagram illustrating an embodiment of a mobile device of the invention. As shown in FIG. 4, the mobile device 140 according to the embodiment of the present invention can be any electronic device capable of Internet access, such as mobile phones, smart phones, personal digital assistants, global positioning systems, and notebook computers. The mobile device 140 at least comprises a storage unit 142, a network connection unit 144, and a processing unit 146. The storage unit 142, such as a memory, can store and record related data, such as a user ID code corresponding to a user of the corresponding mobile device, and related data such as charging status information and notifications received from the server 130 via the network 120. In some embodiments, the status information and notification may include notifying that the electric vehicle has stopped charging, notifying that the vehicle is being moved, and/or notifying that the charging gun of the electric vehicle charging device has been disconnected from the electric vehicle, etc. It is reminded that, the storage unit 142 may include an application AP. The application AP is used for charging operations. The application AP may include a user interface, and through which a charging request can be generated for a specific electric vehicle charging station. In addition, the application AP may have a scanning function for scanning a two-dimensional identification code, such as a QR code on a specific electric vehicle charging station to generate the above-mentioned charging request, thereby starting a charging process. In addition, the scanning function of the application AP can also scan the identification data on the physical sensing card to perform the binding operation of the physical sensing card, the application AP and the corresponding user. The details will be explained later. Through the network connection unit 144, the mobile device 140 can be coupled to and communicate with the server 130 via the network 120, such as a wired network, a telecommunication network, and a wireless network, such as a Wi-Fi network. The processor 146 can control the operations of related software and hardware in the mobile device 140, and cooperate with the implementation of the electric vehicle charging management methods of the present invention. The relevant details will be described later. It is noted that, in some embodiments, the processor 146 may be a general-purpose controller, a microcontroller (Micro-Control Unit, MCU), or a digital signal controller (Digital Signal Processor, DSP), etc., to provide the functions of data analysis, processing and calculation, but the present invention is not limited to this.

Figure 5:
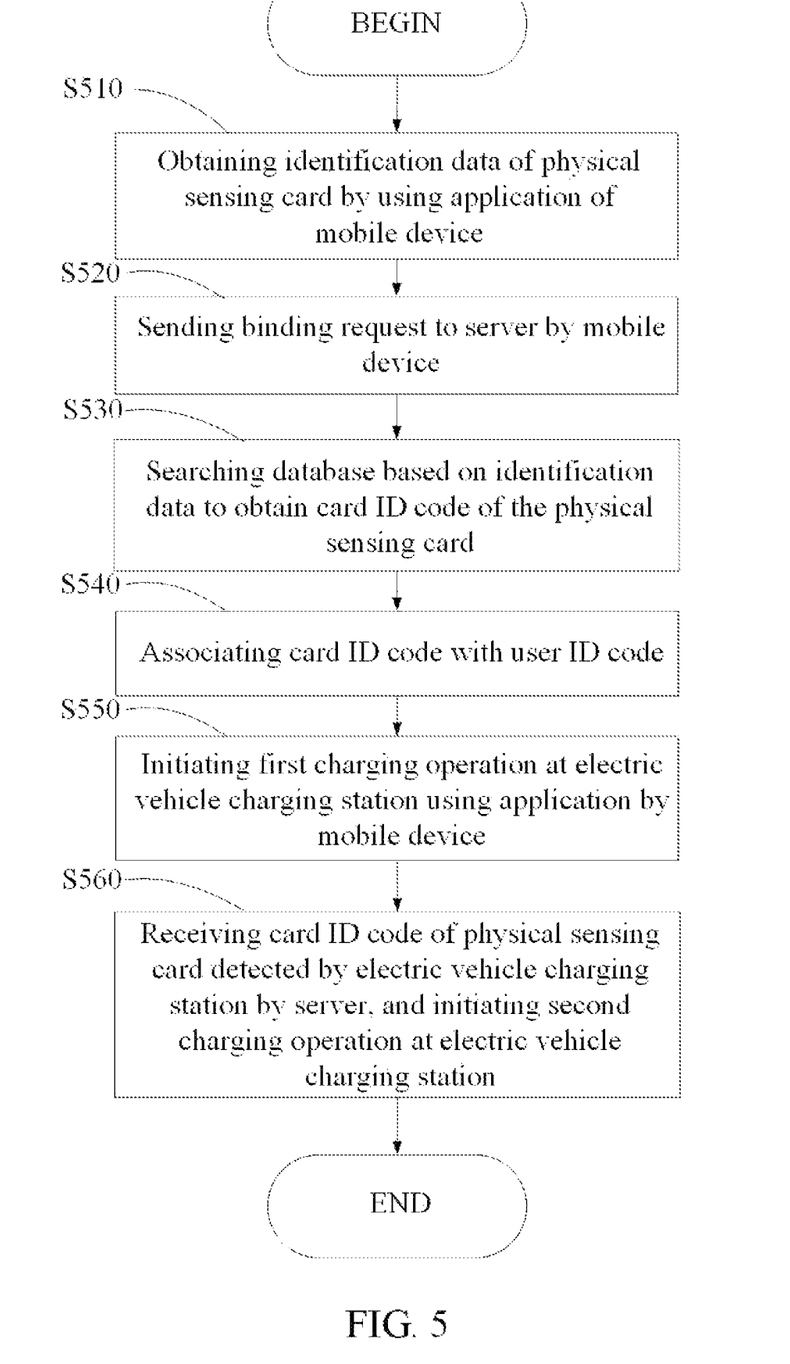
FIG. 5 is a flowchart of an embodiment of an electric vehicle charging management method of the invention.

FIG. 5 is a flowchart of an embodiment of an electric vehicle charging management method of the invention. The electric vehicle charging management method of the invention can be used in a mobile device, a server, and at least one electric vehicle charging station coupled with the server via a network.

In step S510, an application of the mobile device is used to obtain identification data of a physical sensing card. It is noted that, in some embodiments, the identification data may be a two-dimensional identification code, such as a QR code printed on a physical sensing card, such as a RFID card. In some embodiments, the application can use a scanning function to scan the two-dimensional identification code to obtain the identification data. Then, in step S520, the mobile device uses the application to send a binding request to the server via a first network. The binding request comprises the obtained identification data and a user ID code of the mobile device or the application. In step S530, the server searches a database according to the identification data in the binding request to obtain a card ID code of the physical sensing card, and in step S540, the card ID code and the user ID code in the binding request are associated. Then, in step S550, the server provides the mobile device that can use the application to initiate a first charging operation at the electric vehicle charging station, and in step S560, the server can receive the card ID code of the physical sensing card detected by the electric vehicle charging station, and initiate a second charging operation at the electric vehicle charging station. In other words, the user can start the charging operation at the electric vehicle charging station through the application of the mobile device, or use the physical sensing card to directly sense at the electric vehicle charging station to start the charging operation.

Figure 6:
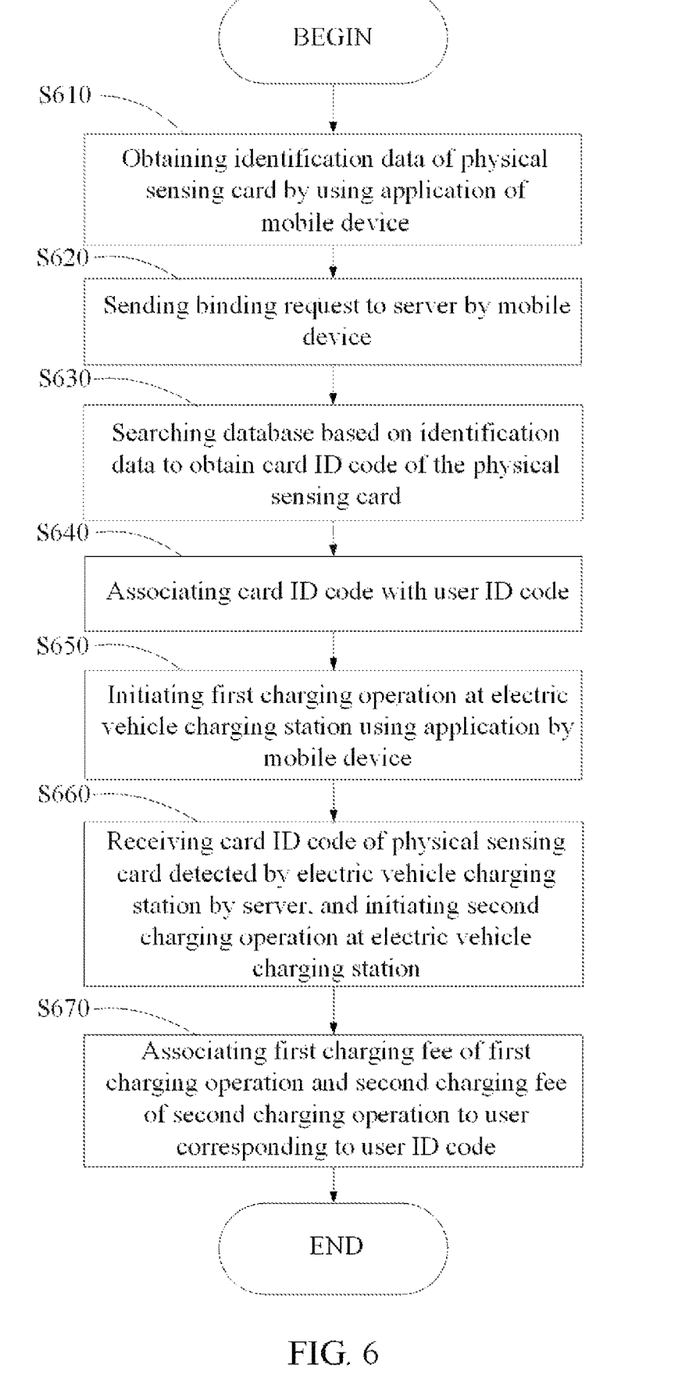
FIG. 6 is a flowchart of another embodiment of an electric vehicle charging management method of the invention.

FIG. 6 is a flowchart of another embodiment of an electric vehicle charging management method of the invention. The electric vehicle charging management method of the invention can be used in a mobile device, a server, and at least one electric vehicle charging station coupled with the server via a network.

In step S610, an application of the mobile device is used to obtain identification data of a physical sensing card. Similarly, in some embodiments, the identification data may be a two-dimensional identification code, such as a QR code printed on a physical sensing card, such as a RFID card. In some embodiments, the application can use a scanning function to scan the two-dimensional identification code to obtain the identification data. Then, in step S620, the mobile device uses the application to send a binding request to the server via a first network. The binding request comprises the obtained identification data and a user ID code of the mobile device or the application. In step S630, the server searches a database according to the identification data in the binding request to obtain a card ID code of the physical sensing card, and in step S640, the card ID code and the user ID code in the binding request are associated. Then, in step S650, the server provides the mobile device that can use the application to initiate a first charging operation at the electric vehicle charging station, and in step S660, the server can receive the card ID code of the physical sensing card detected by the electric vehicle charging station, and initiate a second charging operation at the electric vehicle charging station. In step S670, the server associates a first charging fee corresponding to the first charging operation and a second charging fee corresponding to the second charging operation to a user corresponding to the user ID code. In other words, the user can start the charging operation at the electric vehicle charging station through the application of the mobile device, or use the physical sensing card to directly sense at the electric vehicle charging station to start the charging operation. Regardless of whether it is a charging operation initiated by a physical sensing card or an application, the charging fee for the charging operation performed by the same user will belong to the same user account.

Figure 7:
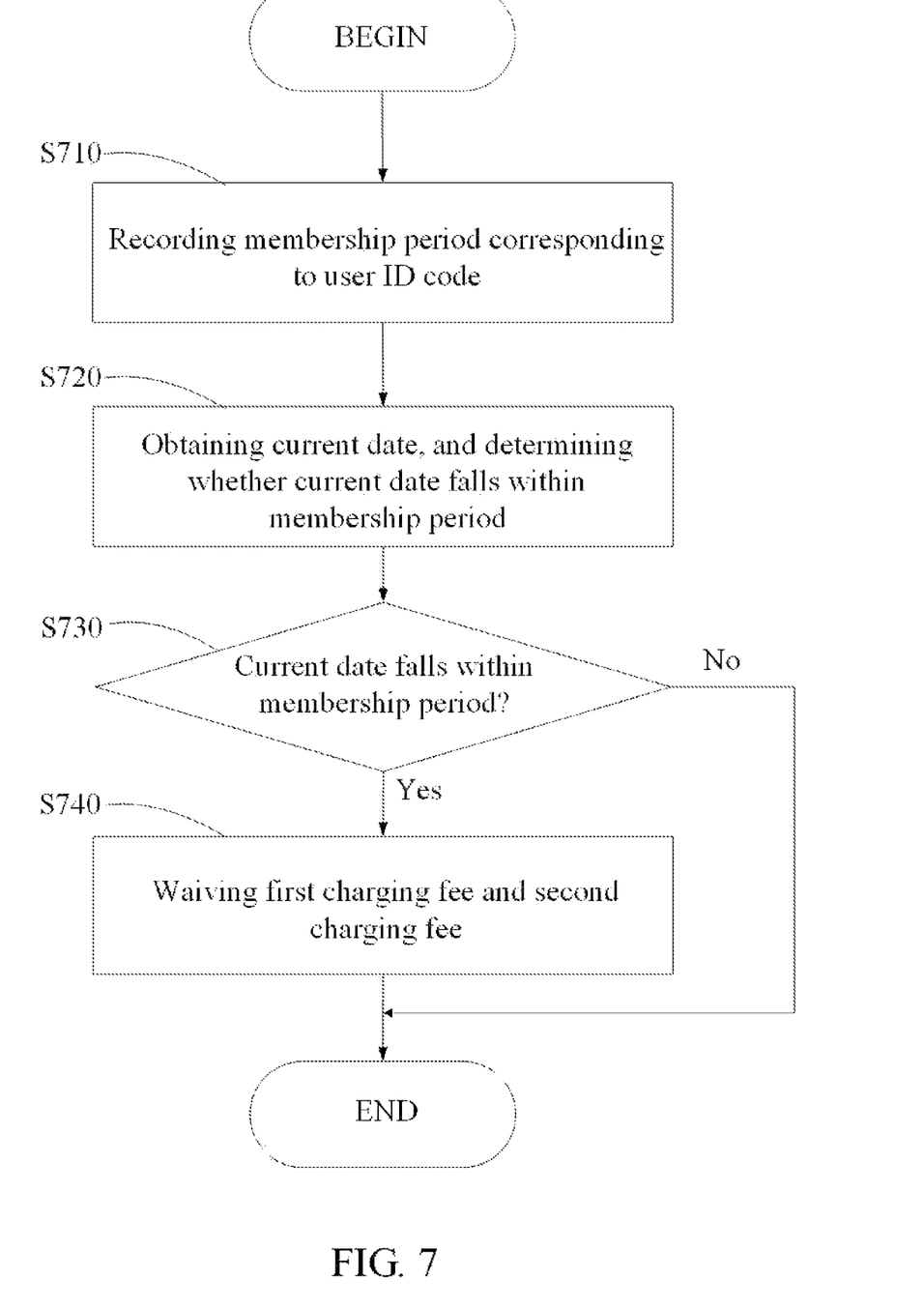
FIG. 7 is a flowchart of another embodiment of an electric vehicle charging management method of the invention.

FIG. 7 is a flowchart of another embodiment of an electric vehicle charging management method of the invention. In this embodiment, when the user is within a valid membership period, the charging fee to which the user belongs can be waived.

In step S710, the server records a membership period corresponding to the user ID code or corresponding to a user of the user ID code. The membership period may include a starting date and/or an expiration date. It is reminded that, in some embodiments, the user can purchase an electric vehicle from a specific car manufacturer, and the membership period is provided by the specific car manufacturer. In some embodiments, the user may be a direct member of a charging station operator corresponding to the server, and the user may directly pay or coordinate with the charging station operator to obtain the membership period. In step S720, the server obtains a current date, and determines whether the current date falls within the membership period. When the current date does not fall within the membership period (No in step S730), the process ends. When the current date falls within the membership period (Yes in step S730), in step S740, the server waives the first charging fee and the second charging fee. In other words, for users, all charging operations within the membership period are free.

Figure 8:
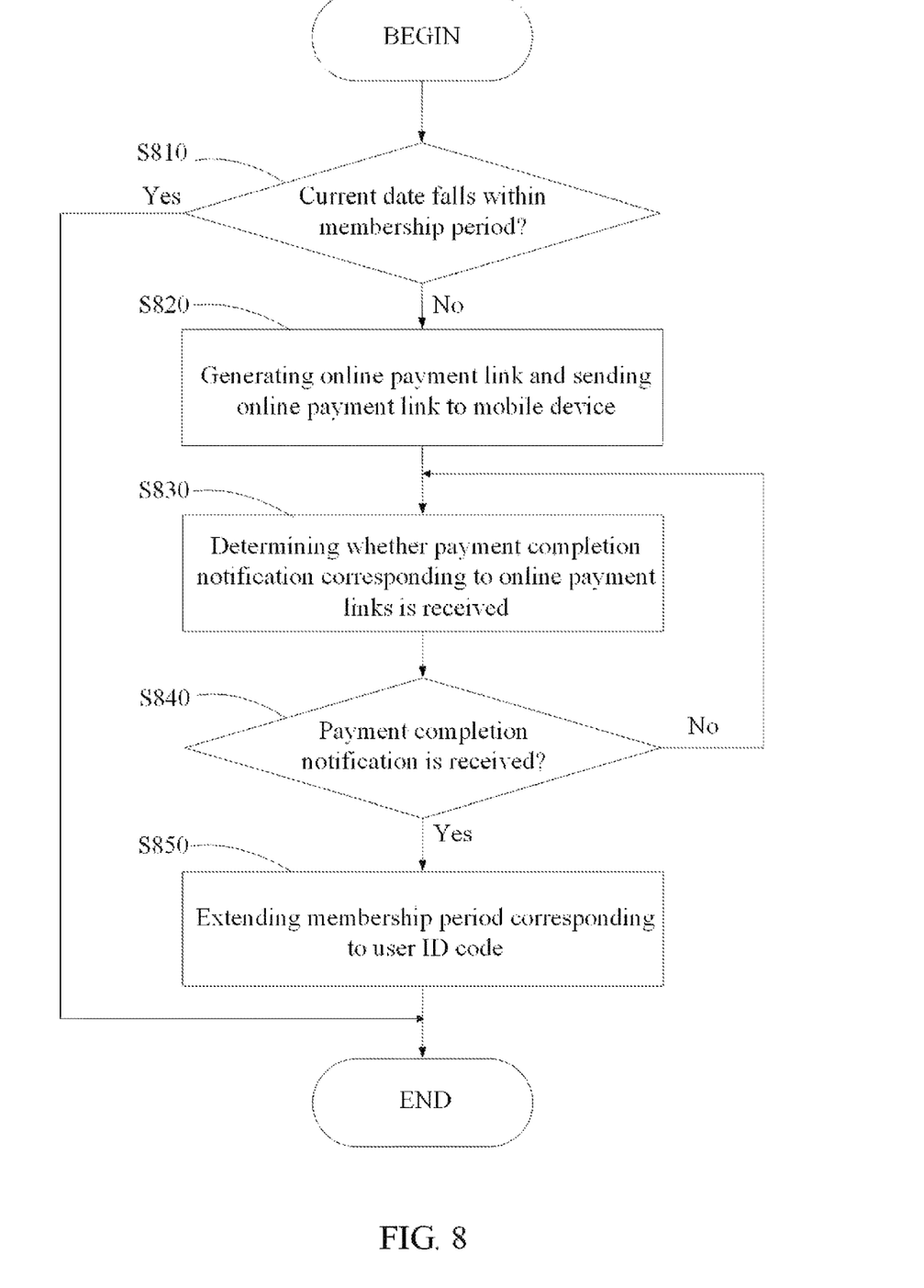
FIG. 8 is a flowchart of another embodiment of an electric vehicle charging management method of the invention.

FIG. 8 is a flowchart of another embodiment of an electric vehicle charging management method of the invention. In this embodiment, when the user's membership period expires, the system can provide a mechanism to extend the user's membership period.

In step S810, when the current date falls within the membership period (Yes in step S810), the process ends. When the current date does not fall within the membership period (No in step S810), in step S820, the server generates an online payment link and transmits the online payment link to the mobile device corresponding to the user ID code or corresponding to the user. Then, in step S830, the server determines whether a payment completion notification corresponding to the online payment link is received. When the server does not receive the payment completion notification corresponding to the online payment link (No in step S840), the process returns to step S830. When the server receives the payment completion notification corresponding to the online payment link (Yes in step S840), in step S850, the membership period corresponding to the user ID code is extended. It is reminded that, in some embodiments, the server may provide different membership term lengths and corresponding membership fees for users to choose and pay.

As mentioned above, in some embodiments, the user may purchase an electric vehicle from a specific car manufacturer, and the membership period is provided by the specific car manufacturer. In some embodiments, the specific car factory may provide a specific period of membership or a specific amount of stored value to the user who purchases the car. The charging fee for the user during this membership period or within this specific amount will be paid by the specific car factory.

Figure 9:
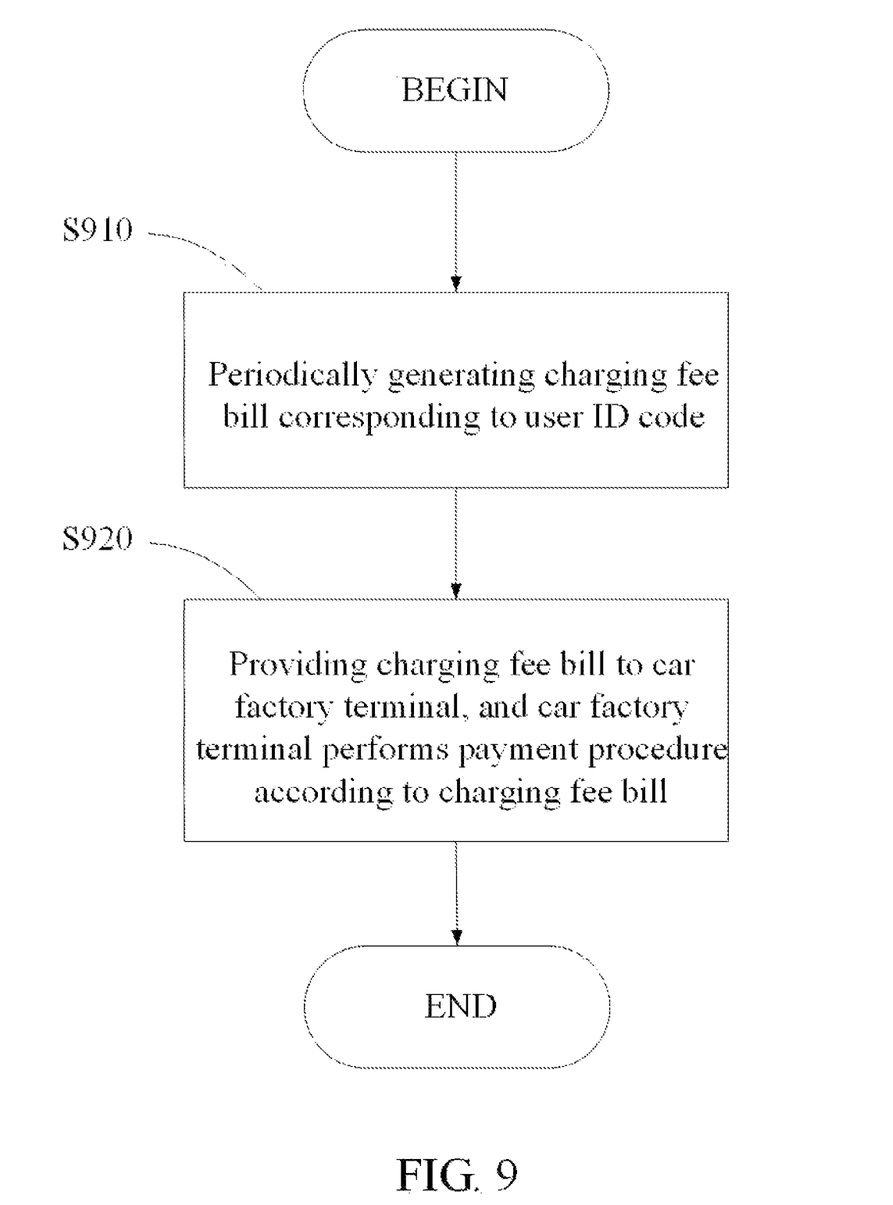
FIG. 9 is a flowchart of another embodiment of an electric vehicle charging management method of the invention.

FIG. 9 is a flowchart of another embodiment of an electric vehicle charging management method of the invention. In this embodiment, the server can periodically provide the user's charging bill to the terminal of the car factory. In step S910, the server periodically generates a charging fee bill corresponding to the user ID code, wherein the charging fee bill includes at least the first charging fee and the second charging fee generated in the embodiment in FIG. 6. In other words, regardless of the charging operation initiated through the physical sensing card or the mobile device application, the related charging fees belong to the same user will be recorded in this charging bill. Then, in step S920, the charging bill is provided to a car factory terminal. The terminal of the car factory can perform a payment procedure according to the charging bill. It is noted that, in some embodiments, the user's charging history can also be generated and provided to the car factory terminal.

Figure 10:
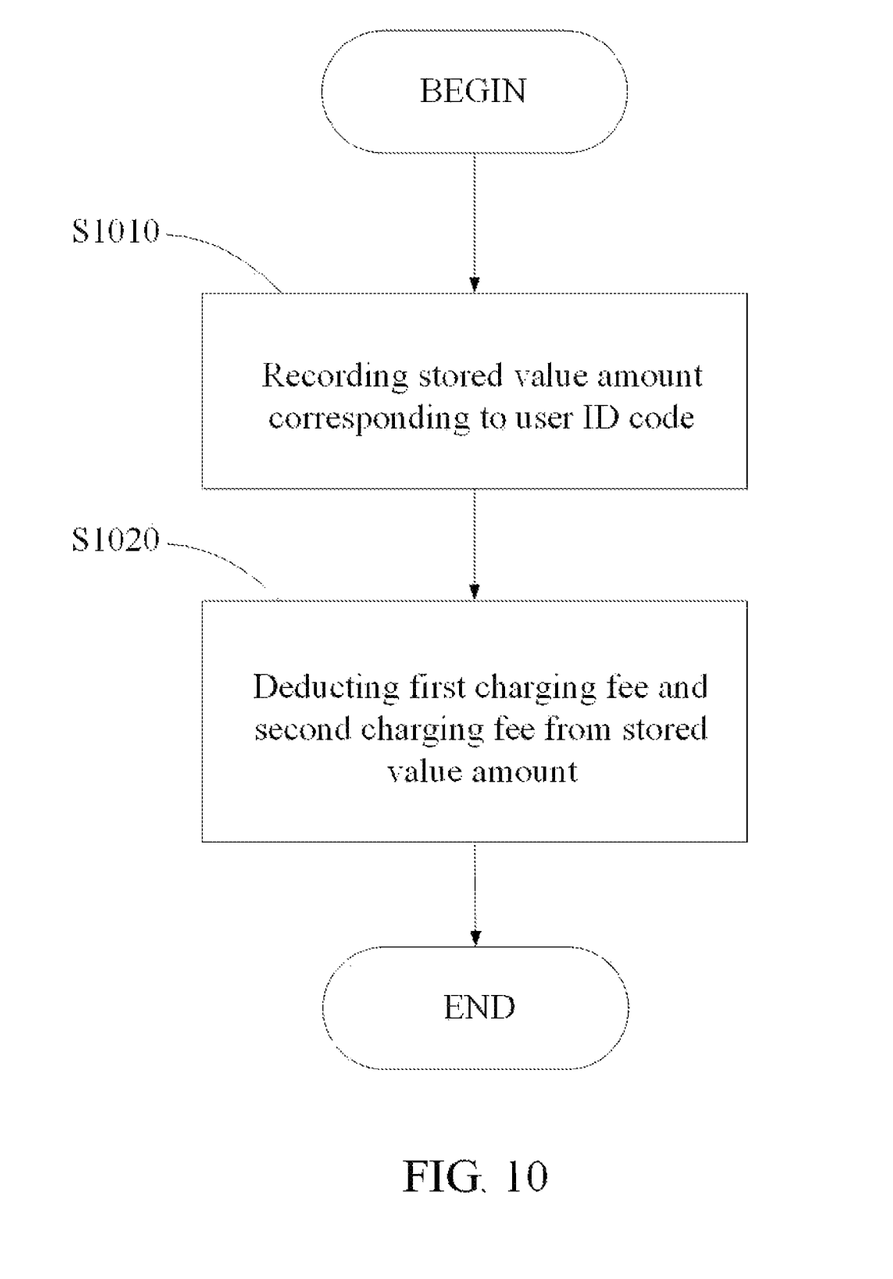
FIG. 10 is a flowchart of another embodiment of an electric vehicle charging management method of the invention.

FIG. 10 is a flowchart of another embodiment of an electric vehicle charging management method of the invention. In this embodiment, the charging fee corresponding to the user can be deducted from the corresponding stored value. First, in step S1010, the server records a stored value amount corresponding to the user ID code/user. It is reminded that, the amount of stored value can be provided by a specific car factory or paid or coordinated by the user directly to the charging station operator. In step S1020, the server deducts the first charging fee and the second charging fee from the stored value amount. In other words, regardless of whether the charging operation is initiated through the physical sensing card or the mobile device application, the related charging fees belong to the same user will be deducted from the corresponding stored value amount.

Figure 11:
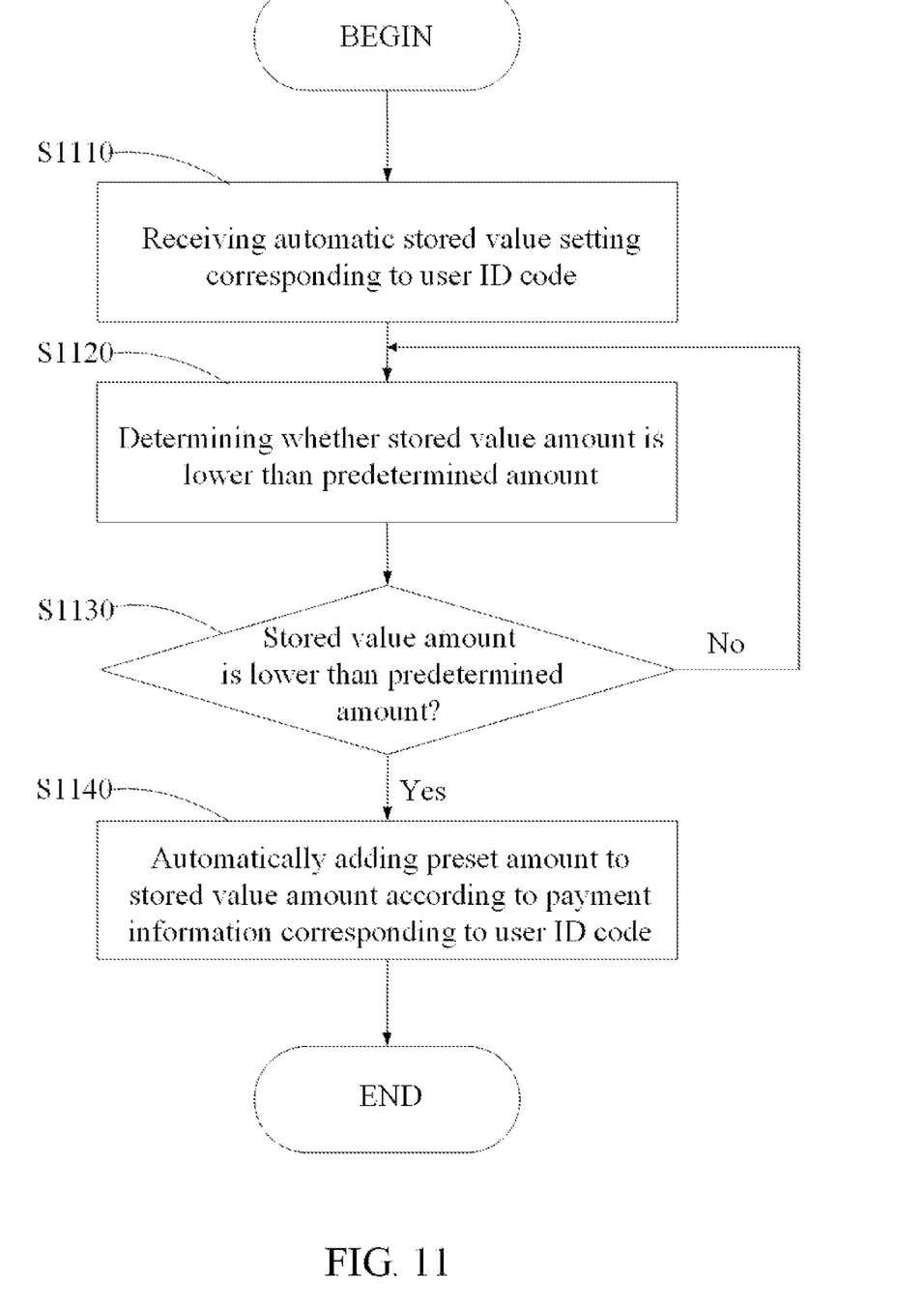
FIG. 11 is a flowchart of another embodiment of an electric vehicle charging management method of the invention.

FIG. 11 is a flowchart of another embodiment of an electric vehicle charging management method of the invention. In this embodiment, the user's stored value amount can be automatically added. First, in step S1110, the server receives an automatic stored value setting corresponding to the user ID code. It is reminded that, in some embodiments, the user can use the application of the mobile device to set the automatic storage value. In step S1120, the server determines whether the user's stored value amount is lower than a predetermined amount, such as NT 500 dollars. When the stored value amount is not lower than the predetermined amount (No in step S1130), the procedure returns to step S1120. When the stored value amount is lower than the predetermined amount (Yes in step S1130), in step S1140, the server automatically adds a preset amount, such as NT 1,000 dollars, to the stored value amount according to the payment information corresponding to the user ID code/user. It is reminded that, in some embodiments, the above-mentioned payment information can be preset in the application.

Therefore, the electric vehicle charging management methods and systems of the present invention can integrate the user's physical sensing card and application to facilitate the user's charging operation. In addition, the charging fees of the corresponding user can also be managed in different modes, thereby increasing the flexibility of charging and fee payment for electric vehicle charging operations.

Electric vehicle charging management methods, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for executing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for executing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. An electric vehicle charging management method for use in a server connected with at least one electric vehicle charging station and a mobile device, comprising:
   obtaining identification data of a physical sensing card by using an application of a mobile device;
   sending a binding request to a server by the mobile device, wherein the binding request comprises the identification data and a user ID code of the mobile device or the application;
   searching a database based on the identification data to obtain a card ID code of the physical sensing card, and associating the card ID code with the user ID code by the server;
   initiating a first charging operation at an electric vehicle charging station using the application by the mobile device;
   receiving the card ID code of the physical sensing card detected by the electric vehicle charging station by the server; and
   in response to the reception of the card ID code, initiating a second charging operation at the electric vehicle charging station by the server.

2. The method of claim 1, further comprising associating a first charging fee corresponding to the first charging operation and a second charging fee corresponding to the second charging operation to a user corresponding to the user ID code.

3. The method of claim 1, further comprising:
   scanning a two-dimensional ID corresponding to the electric vehicle charging station by using the application, and sending the two-dimensional ID to the server via the network; and
   transmitting a charging start command to the electric vehicle charging station via the network by the server according to the two-dimensional ID, so that the electric vehicle charging station executes the first charging operation.

4. The method of claim 2, further comprising:
   recording a membership period corresponding to the user ID code by the server, wherein the membership period has a start date and an expiration date;
   obtaining a current date, and determining whether the current date falls within the membership period by the server; and
   waiving the first charging fee and the second charging fee when the current date falls within the membership period.

5. The method of claim 4, further comprising:
   generating an online payment link and sending the online payment link to the mobile device by the server when the current date does not fall within the membership period;
   determining whether a payment completion notification corresponding to the online payment links is received by the server; and extending the membership period corresponding to the user ID code by the server when the payment completion notification corresponding to the online payment link is received.

6. The method of claim 4, further comprising:
   periodically generating a charging fee bill corresponding to the user ID code by the server, wherein the charging fee bill comprises at least the first charging fee and the second charging fee; and
   providing the charging fee bill to a car factory terminal, wherein the car factory terminal performs a payment procedure according to the charging fee bill.

7. The method of claim 2, further comprising:
   recording a stored value amount corresponding to the user ID code by the server; and
   deducting the first charging fee and the second charging fee from the stored value amount by the server.

8. The method of claim 7, further comprising:
   receiving an automatic stored value setting corresponding to the user ID code by the server;
   determining whether the stored value amount is lower than a predetermined amount; and
   automatically adding a preset amount to the stored value amount according to payment information corresponding to the user ID code by the server when the stored value amount is lower than the predetermined amount.

9. The method of claim 1, wherein the identification data is a two-dimensional ID printed on of the physical sensing card, and the application obtains the identification data by scanning the two-dimensional ID.

10. An electric vehicle charging management system, comprising:
    a mobile device executing an application to obtain identification data of a physical sensing card, and sending a binding request to a server, wherein the binding request comprises the identification data and a user ID code of the mobile device or the application;
    at least one electric vehicle charging station; and
    a server searching a database based on the identification data to obtain a card ID code of the physical sensing card, and associating the card ID code with the user ID code, allowing the mobile to initiate a first charging operation at an electric vehicle charging station using the application, receiving the card ID code of the physical sensing card detected by the electric vehicle charging station, and in response to the reception of the card ID code, initiating a second charging operation at the electric vehicle charging station.

11. The system of claim 10, wherein the server further associates a first charging fee corresponding to the first charging operation and a second charging fee corresponding to the second charging operation to a user corresponding to the user ID code.

12. The system of claim 10, wherein the mobile device further scans a two-dimensional ID corresponding to the electric vehicle charging station by using the application, and sending the two-dimensional ID to the server via the network, and the server transmits a charging start command to the electric vehicle charging station via the network according to the two-dimensional ID, so that the electric vehicle charging station executes the first charging operation.

13. The system of claim 11, wherein the server further records a membership period corresponding to the user ID code, wherein the membership period has a start date and an expiration date, obtains a current date, determines whether the current date falls within the membership period by the server, and waives the first charging fee and the second charging fee when the current date falls within the membership period.

14. The system of claim 13, wherein the server further generates an online payment link and sends the online payment link to the mobile device when the current date does not fall within the membership period, determines whether a payment completion notification corresponding to the online payment links is received, and extends the membership period corresponding to the user ID code when the payment completion notification corresponding to the online payment link is received.

15. The system of claim 13, wherein the server further periodically generates a charging fee bill corresponding to the user ID code, wherein the charging fee bill comprises at least the first charging fee and the second charging fee, and provides the charging fee bill to a car factory terminal, wherein the car factory terminal performs a payment procedure according to the charging fee bill.

16. The system of claim 11, wherein the server further records a stored value amount corresponding to the user ID code, and deducts the first charging fee and the second charging fee from the stored value amount.

17. The system of claim 16, wherein the server further receives an automatic stored value setting corresponding to the user ID code, determines whether the stored value amount is lower than a predetermined amount, and automatically adds a preset amount to the stored value amount according to payment information corresponding to the user ID code when the stored value amount is lower than the predetermined amount.

18. The system of claim 10, wherein the identification data is a two-dimensional ID printed on of the physical sensing card, and the application obtains the identification data by scanning the two-dimensional ID.

19. A non-transitory and tangible machine-readable storage medium comprising a computer program, which, when executed, causes a device to perform an electric vehicle charging management method for use in a server connected with at least one electric vehicle charging station and a mobile device, wherein the method comprises:
  obtaining identification data of a physical sensing card by using an application of a mobile device;
  sending a binding request to a server by the mobile device, wherein the binding request comprises the identification data and a user ID code of the mobile device or the application;
  searching a database based on the identification data to obtain a card ID code of the physical sensing card, and associating the card ID code with the user ID code by the server;
  initiating a first charging operation at an electric vehicle charging station using the application by the mobile device;
  receiving the card ID code of the physical sensing card detected by the electric vehicle charging station by the server; and
  in response to the reception of the card ID code, initiating a second charging operation at the electric vehicle charging station by the server.

* * * * *